US011656093B2

(12) United States Patent
Pan et al.

(10) Patent No.: US 11,656,093 B2
(45) Date of Patent: May 23, 2023

(54) METHOD AND SYSTEM FOR NAVIGATING VEHICLE TO PICKUP / DROP-OFF ZONE

(71) Applicant: Argo AI, LLC, Pittsburgh, PA (US)

(72) Inventors: Jonathan Pan, Campbell, CA (US); Matthew L. Gilson, Pittsburgh, PA (US); Shenglong Gao, Sunnyvale, CA (US)

(73) Assignee: ARGO AI, LLC, Pittsburgh, PA (US)

( * ) Notice: Subject to any disclaimer, the term of this patent is extended or adjusted under 35 U.S.C. 154(b) by 19 days.

(21) Appl. No.: 17/486,319

(22) Filed: Sep. 27, 2021

(65) Prior Publication Data

US 2023/0100961 A1 Mar. 30, 2023

(51) Int. Cl.
*G01C 21/36* (2006.01)
*B60W 60/00* (2020.01)
*G08G 1/14* (2006.01)

(52) U.S. Cl.
CPC ..... *G01C 21/3679* (2013.01); *B60W 60/00253* (2020.02); *G01C 21/3629* (2013.01); *G01C 21/3691* (2013.01); *G08G 1/145* (2013.01); *B60W 2530/201* (2020.02); *B60W 2554/00* (2020.02); *B60W 2555/60* (2020.02); *B60W 2556/40* (2020.02)

(58) Field of Classification Search
CPC ............ G01C 21/3617; G01C 21/3685; G01C 21/3694
See application file for complete search history.

(56) References Cited

U.S. PATENT DOCUMENTS

| 9,733,096 | B2 | 8/2017 | Colijn et al. |
| 10,261,512 | B1 | 4/2019 | Cullinane et al. |
| 10,401,858 | B2 | 9/2019 | Pandit et al. |
| 10,769,452 | B2 | 9/2020 | Rasmusson, Jr. et al. |
| 2009/0069994 | A1 | 3/2009 | Uechi et al. |
| 2017/0138751 | A1 | 5/2017 | Martyniv et al. |
| 2018/0107222 | A1 | 4/2018 | Fairfield et al. |
| 2018/0113456 | A1 | 4/2018 | Iagnemma et al. |
| 2018/0136656 | A1 | 5/2018 | Rasmusson, Jr. et al. |
| 2018/0143641 | A1 | 5/2018 | Rao |

(Continued)

OTHER PUBLICATIONS

U.S. Appl. No. 17/244,420, filed Apr. 29, 2021, Determination of Path to Vehicle Stop Location in a Cluttered Environment.

(Continued)

*Primary Examiner* — Vivek D Koppikar
*Assistant Examiner* — Godfrey Aleksander Maciorowski
(74) *Attorney, Agent, or Firm* — Fox Rothschild LLP

(57) ABSTRACT

This document describes methods by which a system determines a pickup/drop-off zone (PDZ) to which a vehicle will navigate to perform a ride service request. The system will define a PDZ that is a geometric interval that is within a lane of a road at the requested destination of the ride service request by: (i) accessing map data that includes the geometric interval; (ii) using the vehicle's length and the road's speed limit at the destination to calculate a minimum allowable length for the PDZ; (iii) setting, start point and end point boundaries for the PDZ having an intervening distance that is equal to or greater than the minimum allowable length; and (iv) positioning the PDZ in the lane at or within a threshold distance from the requested destination. The system will then generate a path to guide the vehicle to the PDZ.

17 Claims, 8 Drawing Sheets

(56) References Cited

U.S. PATENT DOCUMENTS

| | | |
|---|---|---|
| 2018/0328748 A1 | 11/2018 | Chachra et al. |
| 2018/0329418 A1 | 11/2018 | Baalke et al. |
| 2019/0066515 A1 | 2/2019 | Dyer et al. |
| 2019/0187702 A1 | 6/2019 | Herbach et al. |
| 2019/0193733 A1 | 6/2019 | Russell et al. |
| 2019/0228375 A1 | 7/2019 | Laury et al. |
| 2019/0369621 A1 | 12/2019 | Pandit et al. |
| 2020/0117926 A1 | 4/2020 | Kim |
| 2020/0148196 A1 | 5/2020 | Lim |
| 2020/0158523 A1 | 5/2020 | Kline et al. |
| 2020/0160709 A1 | 5/2020 | Ramot et al. |
| 2020/0166935 A1 | 5/2020 | Herbach et al. |
| 2020/0192382 A1 | 6/2020 | Pandit et al. |
| 2020/0192385 A1 | 6/2020 | Fairfield et al. |
| 2020/0240798 A1 | 7/2020 | Gao et al. |
| 2020/0240799 A1 | 7/2020 | Gao et al. |
| 2020/0310461 A1 | 10/2020 | Kaufman et al. |
| 2020/0346662 A1 | 11/2020 | Suzuki et al. |
| 2020/0363805 A1* | 11/2020 | Arden .................. G01C 21/362 |
| 2021/0053567 A1 | 2/2021 | Dyer et al. |
| 2021/0089788 A1 | 3/2021 | Engle et al. |
| 2021/0096565 A1* | 4/2021 | Xie ...................... G05D 1/0088 |
| 2021/0107476 A1 | 4/2021 | Cui |
| 2021/0114617 A1 | 4/2021 | Phillips et al. |
| 2021/0133466 A1 | 5/2021 | Gier et al. |
| 2022/0073070 A1 | 3/2022 | Niewiadomski et al. |
| 2022/0073099 A1 | 3/2022 | Park et al. |
| 2022/0136847 A1 | 5/2022 | Higuchi et al. |
| 2022/0221867 A1 | 7/2022 | Taveira et al. |
| 2022/0326031 A1 | 10/2022 | Ohnogi et al. |

OTHER PUBLICATIONS

U.S. Appl. No. 17/244,473, filed Apr. 29, 2021, Determination of Vehicle Pullover Location Considering Ambient Conditions.

* cited by examiner

METHOD AND SYSTEM FOR NAVIGATING VEHICLE TO PICKUP / DROP-OFF ZONE

BACKGROUND

When vehicles are used as a taxi, ride-sharing service, shuttle, delivery vehicle, or other vehicle that will pick up and/or drop off a passenger or package at a location, the vehicle or its operator must navigate to a destination to perform the pickup or drop-off action. The general concept of destination is typically an address, set of coordinates, or other indicia that specifies where a passenger, package sender or package recipient would like the vehicle to perform the pickup or drop-off action. However, the generic concept of destination does not necessarily identify the specific location where the vehicle may perform the operation. When a vehicle performs a pickup or drop-off operation at a destination that does not have a designated parking area (such as in front of a hotel or other building on a city street), the vehicle or its operator must determine a location along a road where the pickup or drop-off will occur. In addition, in some situations, upon arrival at a destination the package or passenger may not be ready, and the vehicle may need to circle the block or pull over to wait until the passenger or package is ready for pickup. Other pickup/drop-off locations may not have parking areas but instead require a stop in a designated lane, such as a taxi queue lane or a driveway in front of a hotel entrance. In addition, even designated pickup/drop-off areas are dynamic in that they may be filled or blocked and thus not accessible at a given point in time.

If the vehicle is an autonomous vehicle (AV), the vehicle's self-driving system needs context to understand the scene around the destination, and it must identify where it can successfully pull over given both static and dynamic conditions at and near the designation when the AV arrives. This is a computationally challenging problem, especially in cluttered urban environments where available space to stop may be limited and numerous other actors must be considered before the vehicle implements any maneuver.

This document describes methods and systems that are directed to addressing the problems described above, and/or other issues.

SUMMARY

This document describes methods by which a vehicle that receives a ride service request, or a system that is in electronic communication with a vehicle that is to serve a ride service request, may determine a pickup/drop-off zone (PDZ) to which the vehicle will navigate to perform the ride service request. In this process, when the system receives a ride service request that includes a requested destination for the vehicle, the system will define a PDZ that is a geometric interval that is within a lane of a road at the requested destination by: (i) accessing a set of map data that includes the geometric interval; (ii) using a length of the vehicle and a speed limit of the road at the requested destination to calculate a minimum allowable length for the PDZ; (iii) setting, as boundaries of the PDZ, a start point and an end point having an intervening distance that is equal to or greater than the minimum allowable length; and (iv) positioning the PDZ in the lane at a location that includes or is within a threshold distance from the requested destination. The system will then generate a path to guide the vehicle to the PDZ.

A motion control system of the vehicle may then cause the vehicle to move along the path to the PDZ. In addition, an electronic device within the vehicle may then optionally output the path, the PDZ or both via a display and/or a speaker. For example, the system may display the PDZ as an overlay on the lane in a map on an in-vehicle display for an operator to view.

In some embodiments, when using the length of the vehicle and the speed limit of the road at the requested destination to calculate a minimum allowable length for the PDZ, the system may identify a speed limit factor that is a function of the speed limit of the road, and it may multiply the length of the vehicle by the speed limit factor.

In some embodiments, the system may receive traffic data for the road at the requested destination. If so, the system also may use the traffic data to calculate the minimum allowable length for the PDZ. The system also may use the current traffic data to generate a traffic label for the road at the requested destination, and it may identify a traffic factor that is a function the traffic label. Then, when using the length of the vehicle to calculate the minimum allowable length of the PDZ, the system may multiply the length by the traffic factor.

In some embodiments, the system may receive environmental data for the road at the requested destination. If so, then it may use the environmental data to generate an environmental factor. Then, when calculating the minimum allowable length for the PDZ, the system also may use the environmental factor to calculate the minimum allowable length for the PDZ. A perception system may generate the environmental data by: (a) using a temperature sensor of the vehicle to measure ambient temperature around the vehicle; (b) using a rain sensor of the vehicle to measure a precipitation level around the vehicle; and/or (c) using a light sensor of the vehicle to measure a luminance level of ambient light around the vehicle.

In some embodiments, when positioning the PDZ in the lane at a location that includes or is within a threshold distance from the requested destination, the system may require that the location satisfy one or more the following criteria: (a) a start boundary of the PDZ must be located at least a threshold distance after a first intersection along the path to the PDZ; (b) an end boundary of the PDZ must be located at least a threshold distance before a second intersection along the path after the PDZ; (c) the lane must be of a specified type of lane; and/or (d) the lane must not be of a restricted class of lane.

In some embodiments, when the vehicle approaches or reaches the PDZ, if a perception system of the vehicle determines that an object is occluding at least a portion of the PDZ, a motion planning system of the vehicle or another processor may use data captured by the perception system to identify a stopping location that does not include the portion that is occluded. The system or processor may then generate an alternate path to guide the vehicle to the stopping location. A motion control system of the vehicle may then cause the vehicle to move into the stopping location.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or "includes"), but not limited to."

This document describes processes by which an autonomous vehicle (AV) may make decisions about where and when to move when making a ride service trip during which the AV will pick up, drop off, or both pick up and drop off one or more passengers, packages or other objects. This document describes processes by which a vehicle navigation system may guide an operator of the vehicle to a particular pickup or drop-off location.

For simplicity, except where specifically denoted, when this document uses the term "passenger" it is intended to cover not only people, but also objects such as packages. In addition, the term "ride service" is intended to include both passenger and package transportation services.

This document will use the term "pickup/drop-off operation" to refer to an operation in which a vehicle stops to pick up a passenger, to drop-off a passenger, or to perform both pickup and drop-off operations.

Definitions for additional terms that are relevant to this document are included in the discussion below.

Figure 1:
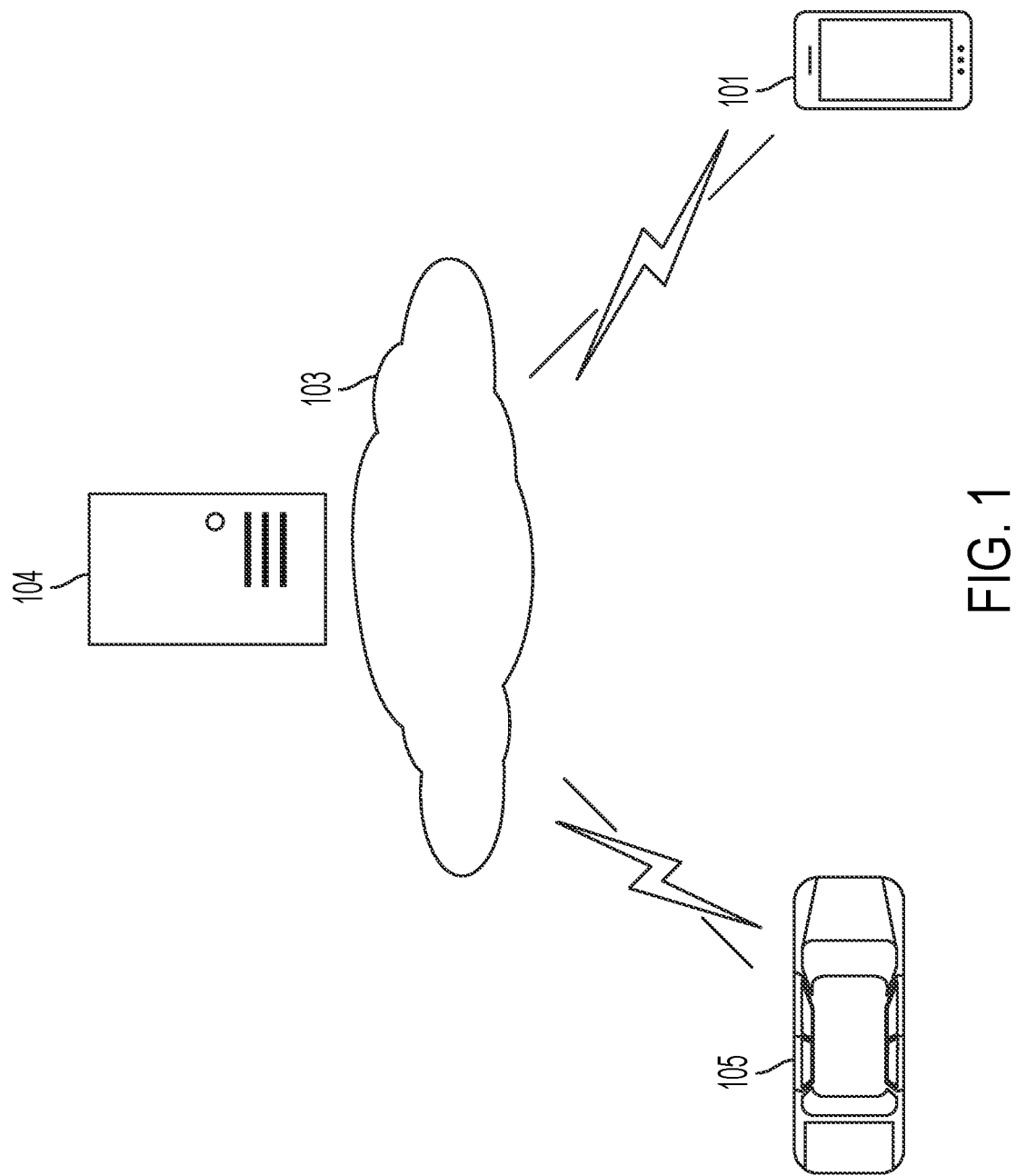
FIG. 1 illustrates example components of system in which a vehicle receives a ride service request from an electronic device.

The processes described in this document start with transmission and receipt of a ride service request, which is illustrated by way of example in FIG. 1, in which a transceiver that is within a vehicle 105 receives a ride service request that an electronic device 101 transmitted via a network 103. The request is shown as transmitted via a remote server 104 that receives the request, processes it, and relays it to the vehicle via the network 103. However, the ride service request could also be transmitted directly from the electronic device 101 to the vehicle 105, such as by a Bluetooth or other near-field or short range communication if the electronic device 101 is within the vehicle 105, or by a wired communication link if the electronic device 101 is a component of the vehicle 105 such as in-dashboard touch screen display device or a microphone that is part of a vehicle speech-to-text recognition system. The operator of the electronic device 101 may be a passenger, a package shipper or recipient, the driver of the vehicle 105, or another person who desires the vehicle to move to a pickup or drop-off location. The request could be to initiate a new ride service request or alter an existing ride service request.

The passenger electronic device 101 is an electronic device containing a browser, a dedicated ride service application or another application via which a user of the device may submit a request for a pickup/drop-off operation. The request will be in the form of data, transmitted via data packets, that includes a destination. The destination may be a destination for a passenger or package loading operation, or a passenger or package unloading operation. The request may include other information such as identifying information about the passenger, as well as a pick-up time.

When navigating in an environment, in-vehicle navigation systems and AV motion planning systems rely on map data. The available map data, especially when used by an AV motion planning system, may be that of a high definition (HD) map. An HD map is a set of digital files containing data about physical details of a geographic area such as the geometric boundaries of roads, lanes within roads, barriers, and road surface markings. Map data also may contain information about traffic control measures such as posted speed limits, for particular road segments, as well as traffic signals and signs that are positioned along particular locations on one or more lanes. An AV uses HD map data to augment the information that the AV's on-board cameras, LiDAR system, environmental sensors and/or other sensors perceive. The AV's on-board processing systems can quickly search map data to identify features of the AV's environment and/or to help verify information that the AV's sensors perceive.

Some pickup/drop-off locations may be predefined and stored with the available HD map data. However, designated pickup/drop-off locations are not predefined for all possible pickup/drop-off locations. In addition, in some areas such as urban environments, the pickup or drop-off location may not be fixed and may change based on certain conditions. In each such case the AV must dynamically determine when and where it can execute pickup and drop-off operations in compliance with permissible stopping criteria. The AV must be able to make these decisions in consideration of the criteria, passenger convenience and the burden that the AV stop may place on other vehicles that are moving near the pickup/drop-off location.

As used in this document, the term "requested destination" or simply "destination" refers to a location for which a passenger or other person system acting on behalf of the passenger submits, and the vehicle or its related navigation system receives, a request for the vehicle to perform a pickup or drop-off operation. A requested destination may be a street address, a set of coordinates that can be found in map data, the names of two streets that form an intersection, a landmark, a transit stop name, or another identifier of a pickup/drop-off location.

This document may use the term "pickup/drop-off zone" (PDZ) refers to an interval around a requested stopping location at which an AV is permitted to stop to perform a pickup or drop-off operation. In some situations, a vehicle's motion planning system may dynamically define a PDZ by applying a stored set of rules to the map data and data that the vehicle's perception system collects in real-time. In other situations, PDZs may be defined in map data as one or more polygons positioned in a lane segment. The vehicle's motion planning system will use PDZs as a guide to help the vehicle dynamically determine where to stop, such as in-lane or curbside.

The term "stopping interval" refers to an interval within a PDZ at which the vehicle actually stops to perform the pickup or drop-off operation. A stopping interval may encompass the entire PDZ, or it may be a segment within the PDZ. The stopping interval may include the requested destination, or it may be another segment within the PDZ that is near the destination but not precisely at the destination.

Figure 2:
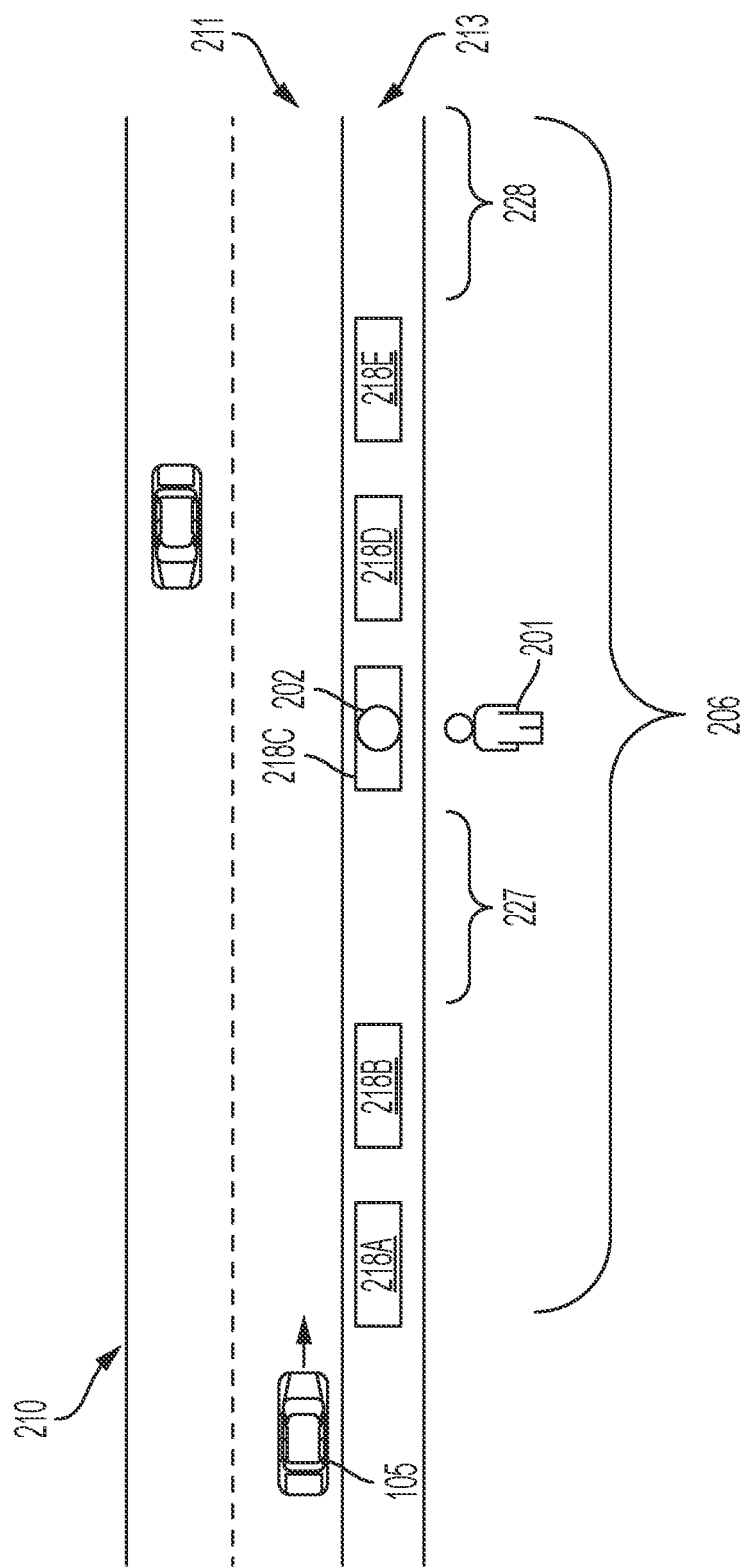
FIG. 2 illustrates a pickup/drop-off interval of a mapped area within which a vehicle may perform a pickup or drop-off service at or near a desired stopping location.

The concepts of a requested destination, pickup/drop-off zone, and stopping interval are illustrated by way of example in FIG. 2, in which the vehicle 105 has access to a map of an area, which in this example is a grid of roads that includes street 210. Street 210 includes multiple lanes, including the AV's lane of travel 211 and a curbside or parking lane 213. The map may be stored in a memory device onboard the vehicle, although it could also be stored on a mobile electronic device or offboard server that is in communication with the vehicle. The map may be periodically updated by the remote server and/or augmented by information that the vehicle's perception system detects as the vehicle 105 moves through the area.

In operation, the vehicle 105 receives a ride service request to pick up or drop off a passenger 201 or package at a requested destination 202. The motion planning system of the vehicle 105 then determines a path or route along which the vehicle 105 may navigate to the requested destination 202. The path may be a sequence of streets or lanes leading up to a PDZ 206, which in the example shown is a segment of the parking lane 213 that includes the requested destination 202 and one or more stopping intervals within the PDZ 206.

As shown in FIG. 2, any number of obstacles 218A-218E may be positioned in the PDZ 206. The obstacles 218A-218E, which this document also may refer to alternatively as obstructions or occlusions, may be other vehicles, people, structures, signs or other items that prevent the vehicle from entering the PDZ at the obstacle's location. In this example, the PDZ is occluded as one of the obstacles 218C prevents the vehicle 105 from stopping at the requested destination 202. When the vehicle 105 is an AV, the AV's perception system will identify and classify each of these obstacles, and since the requested destination 202 is blocked the AV's motion planning system will determine one or more lane segments within the PDZ that can serve as a stopping interval. Two candidate stopping intervals 227, 228 are shown in FIG. 2. The AV's motion planning system or another processor will select one of the candidate stopping locations as the final stopping location to which the AV will navigate and perform the pickup/drop-off operation. The system will then generate an alternate path to guide the vehicle to the final stopping location. Methods by which the AV will determine the candidate stopping intervals 227, 228 and select one as the final stopping location for the pickup/drop-off operation will be described below.

Figure 3:
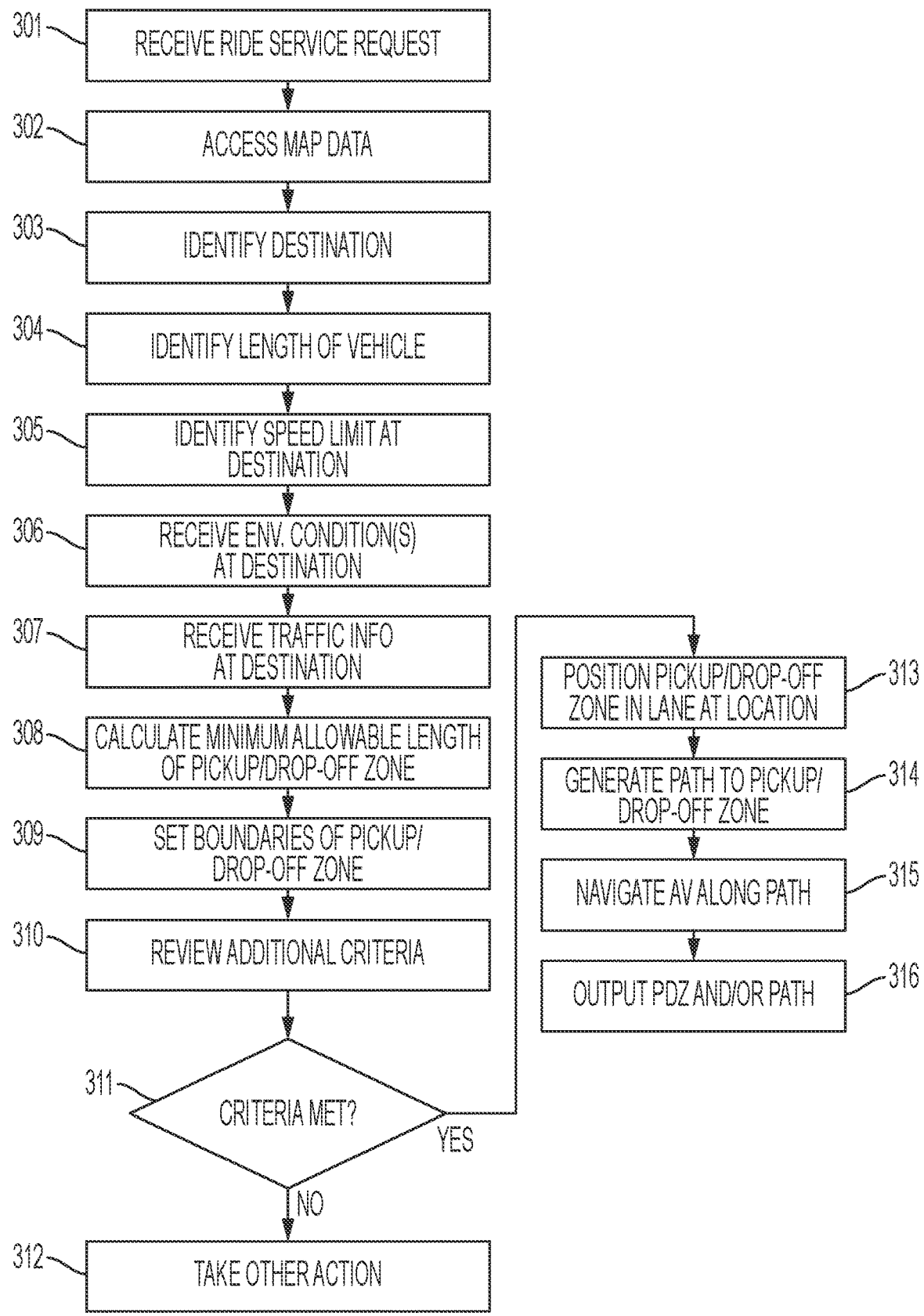
FIG. 3 is a flow diagram illustrating example steps by which a system may determine a pickup/drop-off zone in response to a ride service request.

FIG. 3 is a flow diagram illustrating example steps by which a processor may determine a PDZ in response to a ride service request. As described above, the processor may be a processor in the vehicle, an electronic device that is carried within the vehicle, or a remote computing device that communicates with the vehicle via a wireless communication network. At 301 the system will receive a ride service request that was transmitted by a ride service application on a passenger electronic device. The transmission may be direct from the electronic device, or indirectly via a remote server that receives the request, processes it, selects the vehicle to handle the request, and that transmits the request to the processor. At 302 the system will access map data as described above, and it may use the map data in subsequent steps as will be described below.

Figure 4:
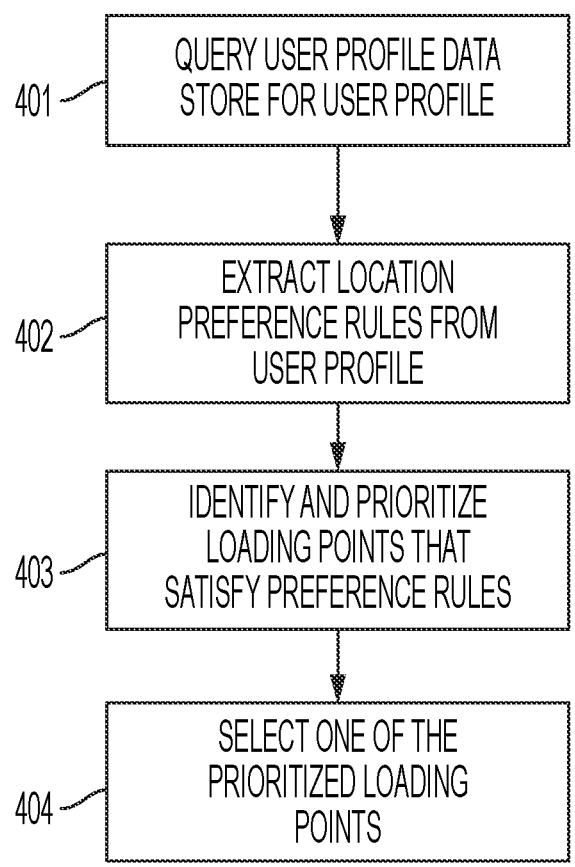
FIG. 4 is flowchart illustrating a process for using user preference data to determine a loading point for a ride service.

At 303 the system will examine the ride service request to identify a requested destination for a loading operation or an unloading operation. The ride service request may include the requested destination, and/or other information such as identifying information about the passenger, a landmark that is near the destination, a pick-up time, or other data. Thus, the requested destination may be an element of the ride service request. In addition or alternatively, referring to FIG. 4, at 401 to determine the requested destination the system may use a user identifier associated with the passenger electronic device to query a user profile data store to identify a stored profile that is associated with the same user identifier. The user profile data store may be part of a remote server such as server 104 of FIG. 1, stored in the electronic device's onboard memory, or a combination of the two. At 402 the system may extract, from the identified profile, one or more location preference rules for the user. At 403 the system will then analyze the map data and only consider a location to qualify to be a requested destination if it satisfies at least a threshold number of the user's location preference rules. At 403 the system may also rank and prioritize potential destinations based on the number of location reference rules that the potential destination satisfies. For example, the user may enter a requested destination in the form of a building name that has multiple entrances, but the user's location preference rules may indicate that the user prefers to be picked up at a particular one of those entrances. At 404 the system may then select the highest ranking or prioritized loading point as the final destination.

Returning to FIG. 3, in addition to identifying the destination of a ride service request, at 304 the processor will identify a length of the vehicle, which will be stored in a memory that is accessible to the processor.

At 305 the system will identify a speed limit that applies to the road at the destination. The system may do this by extracting a posted speed limit from the map data. Alternatively, the system may identify a speed limit posted on a sign that is detected by a camera of the vehicle's perception system.

Once the system has identified at least the vehicle length and the posted speed limit, the system may then calculate a minimum allowable length for the PDZ at 308. The minimum allowable length will be distance that is a function of at least the vehicle length and the posted speed limit. For example, the function may identify a default length L as the length of the vehicle or some multiple of than the length of the vehicle (such as 1.2, 1.4, or 1.5 times the vehicle's length). The system may then adjust the default length by a factor S that is a function of the posted speed limit. If the speed limit is within the first threshold, such as no more than 25 miles per hour (mph) or 40 kilometers per hour (km/h), then the factor S may be 1. However, if the speed limit is more than the first threshold but within a second threshold (such as 40 mph or 80 km/hr), then the factor S may be a number greater than 1 (such as 1.2). Any number of thresholds and factors may be available, or the factors may be a sliding scale or function of the actual posted speed limit.

Optionally, the system may consider other information when calculating the minimum allowable length of the PDZ at 308. For example, at 306 the system may receive environmental data indicating one or more environmental conditions at the requested destination. The system may receive this from an external server such as a weather information system. In addition or alternatively, the system may receive environmental data from one or more sensors of the vehicle's perception system, such as a temperature sensor, a rain sensor, or an ambient light sensor. The system may then calculate an environmental factor E that accounts for the environmental information when calculating the minimum allowable length for the PDZ. For example, the system may use a combination of weather information and a rain sensor to determine that icy conditions are likely, and thus it will apply an environmental factor of a value greater than 1 (such as 1.3) that extends the length of the PDZ by the environmental factor. As another example, the system may apply an environmental factor greater than 1 (such as 1.1) when a light sensor indicates that it is dark vs. when the light sensor detects at least a threshold level of luminance.

As another example of other information that the system may consider when calculating the minimum allowable length of the PDZ at 308, at 307 the system may receive traffic data for the road at the requested destination. The system may receive this from an external traffic database via a wireless communication link, by the vehicle's perception system, or by a combination of the two. The system may then consider the traffic data when calculating the minimum allowable length for the PDZ. For example, the system may use the current traffic data to generate a traffic label for the road at the requested destination. The label may be, for example, a high traffic label, a moderate traffic label, or another label indicating traffic levels that are between those two labels, or even more extreme labels. The system may then adjust the default length of the vehicle by a factor T that is a function of the traffic label.

Thus, as described above, a possible algorithm for calculating the minimum allowable length of the PDZ may be:

minimum allowable length=L*S*T*E, in which:

L is the length of the vehicle;

S is a speed limit factor that is a function of the speed limit at the requested destination;

T is an optional traffic factor that is a function of the traffic level at the requested destination; and E is an optional environmental factor that is a function of one or more environmental conditions at the requested destination.

Once the system has determined the minimum allowable length of the PDZ, at 309 then will define boundaries of the PDZ to include a start boundary and an end boundary that are equal to or greater than the minimum allowable length away from each other. At 313 the system will then position the PDZ on a lane segment in the map at a location that satisfies one or more additional criteria. The system may review the criteria at 310 and determine which locations satisfy the criteria at 311 by applying map data and the defined boundaries of the PDZ to one or more rules such as any or all of the following:

(a) The PDZ must include the requested destination, or it must have a starting boundary point or ending boundary that is no more than a threshold distance away from the requested destination.

(b) The PDZ must not encroach into an intersection of the lane of with another street. For example, the rules may require that the start boundary of the PDZ must be located at least 6 meters (or another specified distance) after a first intersection along a path to the PDZ, that the end boundary must be at least 6 meters (or another specified distance) before a subsequent intersection along a path after the PDZ, or that both boundaries must satisfy these criteria. Alternatively, instead of using specified threshold distances in this rule, the system may use a threshold distance that is a function of the vehicle's length, such as 1.3 times the length of the vehicle.

(c) The PDZ must be located in a specified lane of the road. For example, the system may specify the rightmost lane, or the leftmost lane, of the road depending on factors such as the country for which the map data applies (such as the United States. vs. the United Kingdom), as well as a class of road (such as one-way vs. bi-directional). For example, the system may choose rightmost for a United States two-directional road, and it may choose leftmost for a United States one-way road.

(d) The PDZ must not be located in a lane that is of a restricted class, such as a lane that is labeled as a bus lane or a bike lane in the map data.

(e) The PDZ must not be located in a segment of a lane that exhibits certain geometric features, such as a division in two, or a merge of two lanes into one.

If the system is unable to identify any PDZ in the map data that can both (a) have boundaries that are the minimum allowable length away from each other and (b) meet the other criteria, then the system may take another action at 312 such as: (a) display a message indicating that the requested pickup location is invalid; (b) transmit a message to the requesting electronic device indicating that a PDZ is unavailable at the requested destination; (c) find an alternate destination that is meets one or more criteria (such as being within a threshold distance of the requested destination, being on the same side of the street as the requested destination, being within a driveway or designated parking zone that is near the requested destination, or being on the same block but on a cross street before or after the requested destination) and present the user with the alternate destination for review and/or approval; and/or (iv) prompt the user to provide an alternate destination.

Figure 5:
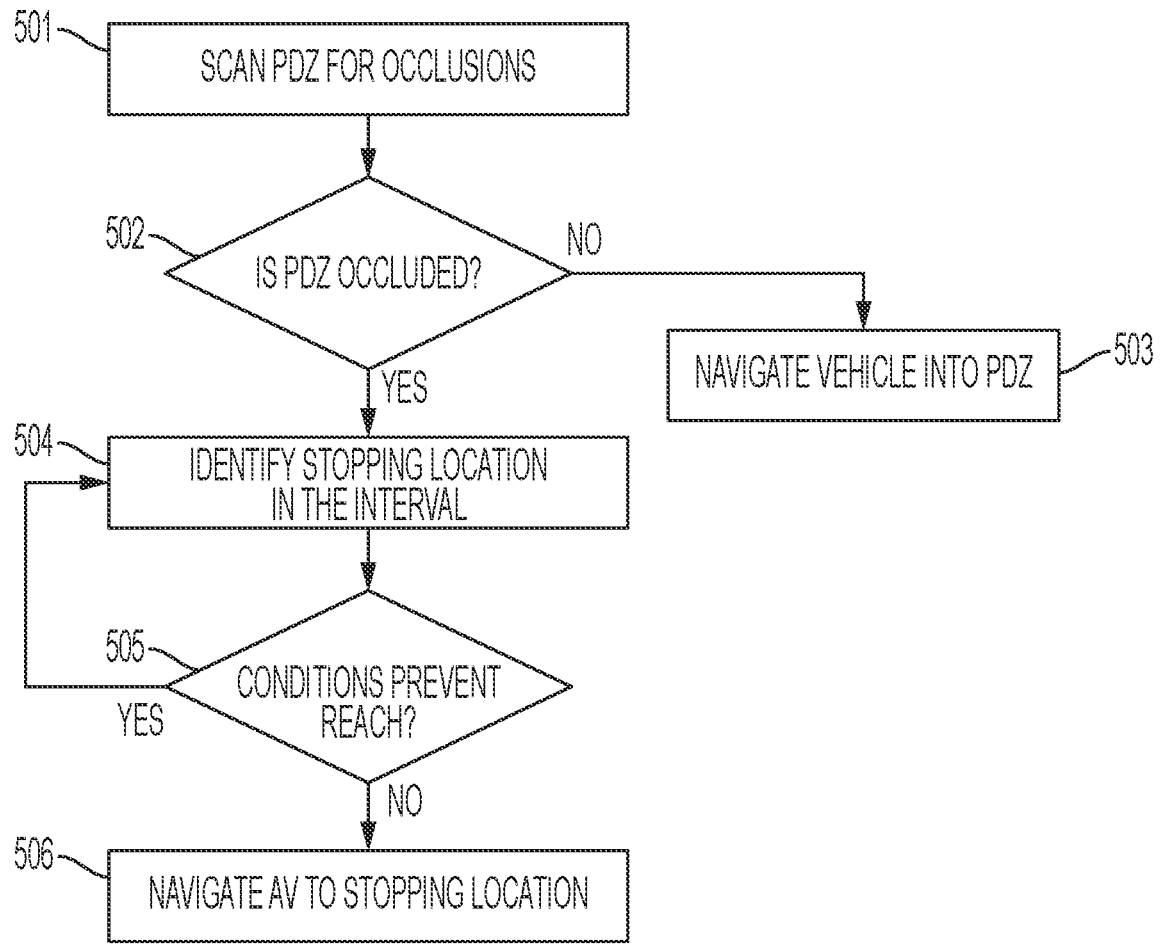
FIG. 5 illustrates example processes by which an autonomous vehicle may select a stopping location when multiple candidate locations are available and/or when a desired location is occluded.

If the system identifies multiple candidate PDZs that satisfy the criteria, then the system may rank, score and/or otherwise prioritize candidate PDZs depending on how many of location preference rules they satisfy, or by assigning each location a score in which some location preference rules are given higher weights than others. For example, the location preference rules may give preference to a PDZ that is positioned in front of an entry door of a building that is the requested destination. Alternatively, the rules may give preference to a candidate PDZ having a midway point that is closest to the requested destination, or to a current position of the requesting electronic device. In the discussion of FIG. 5 below, we provide example preference rules for selecting stopping locations within a PDZ. Such rules also may be used to choose a PDZ from multiple candidate PDZs.

Once the system positions the PDZ in the map at 313 it will generate a path to the PDZ at 314. Any now known or yet-to-be-developed methods by which a vehicle navigation or motion planning system may plan a trajectory may be used in the path planning process, including but not limited to those that will be discussed below in the context of FIGS. 6 and 7.

Once the system generates a path to the PDZ, if the vehicle is an AV then at 315 the AV's motion control system may cause the AV to move along the planned path to the PDZ. Any now known or yet-to-be-developed methods by which a vehicle navigation or motion planning system may generate a planned path may be used, including but not limited to those that will be discussed below in the context of FIGS. 6 and 7. If the vehicle is not an AV, or even if it is an AV that is equipped with an in-vehicle user interface such as a display or audio speaker, then at 316 the system may output the PDZ and/or the planned path via the user interface. For example, the system may display the PDZ as an overlay on a map that includes the road at the requested destination.

Referring to FIG. 5, if the vehicle is an AV, then at 501 when the vehicle reaches or approaches the PDZ, the vehicle's cameras, LiDAR system, or other perception system sensors will scan the PDZ to determine whether any objects occlude any portion of the PDZ. For example, as was shown in FIG. 2, an obstacle 218C that is another vehicle may be parked in the PDZ 206 at the requested destination 202 and thus prevent the ride service vehicle 105 from stopping at the requested destination. Other objects may occlude the PDZ in whole or in part. For example, the perception system may determine that:

vehicles or other objects are positioned in front of and behind the PDZ in locations that do not provide the PDZ with sufficient space to move into the PDZ;

the PDZ contains a pothole of at least a threshold size, or a puddle of water;

the curb adjacent to the PDZ includes a fire hydrant, mailbox, signpost or other object positioned in a location that will interfere with swinging the door of the vehicle open at that location; or another object interferes with the vehicle's ability to enter into the PDZ and/or perform a loading or unloading operation in the PDZ.

If no occlusion prevents the AV from stopping in the PDZ (502:NO), then the AV's motion control system may cause the AV to continue moving along the path into the PDZ at 503, and to stop to perform a pickup/drop-off operation within the PDZ. However, if an occlusion will prevent the AV from stopping in the any portion of the PDZ (502:YES), then at 504 the AV's motion planning system may use perception data about the PDZ to identify one or more stopping locations that are either within or outside of the PDZ. To qualify as a stopping location the location must be free from occlusion that will prevent the AV from stopping there. In addition, the stopping location must satisfy the length and other criteria, which the AV may determine using the process described above in the context of FIG. 3. Optionally, each stopping location also must satisfy one or more permissible stopping location criteria, such as:

Distance from curb: If a stopping location is in a parking lane, the stopping location must be within a threshold distance from the curb; if in a lane of travel, the stopping location must be biased to the right of the lane (if in a location where the right side of a street lane is the forward lane of travel, otherwise biasing to the left of the lane), optionally partially extending to an area that is outside of the lane.

Remaining lane width: In addition to or instead of distance from the curb, if the AV will stop fully or partially in a lane of travel it may consider the amount or size of the lane that will remain unblocked when it stops. If the AV will block too much of the lane, the AV may create a bottleneck for other vehicles that are trying to pass by the stopping location. The system may give preference to stopping locations that will allow for a relatively larger remaining lane width than it gives to those that require a relatively smaller remaining lane width, and thus help reduce the risk of causing bottlenecks.

Distance from PDZ: The stopping location may be required to be no more than a threshold distance from the originally defined PDZ. The threshold may vary based on specified conditions. For example, if the service request includes a heavy package or a passenger with limited mobility, the threshold may be shorter than a default as described above. The threshold also may be reduced during certain environmental conditions, such as rain or snow.

Distance from start boundary of the PDZ: Stopping locations within a PDZ that the AV will reach first may be given higher preference than stopping locations that the AV will encounter later in the PDZ. This helps to ensure that the AV finds a suitable stopping location before reaching the end boundary of the PDZ.

Gap between object pairs adjacent to the requested stopping location: A stopping location that is of larger size (as defined by the locations of a pair of objects positioned in front of and behind the stopping location) may be given preference over a stopping location that is of smaller size, especially if the smaller size will require the AV to angle into the stopping location and remain partially protruding into the lane of travel.

Kinematic constraints of the vehicle: Steering limits of the vehicle's platform may limit the vehicle's ability to navigate into a stopping location without exceeding a threshold number of multiple-point turns or forward/reverse gear changes. The system may give preference to those stopping locations that do not require the thresholds to be exceeded, or which require relatively fewer multiple-point turns and/or forward/reverse gear changes.

Deceleration limits: A stopping location that will require the AV to decelerate at a rate that is higher than a threshold in order to stop may be given less preference or avoided entirely. The system may determine the required deceleration by considering the distance D from the AV to the stopping location and the vehicle's current speed V, using an equation such as deceleration=$V^2/2$ D. The equation optionally also may factor in comfort parameters and other dynamic components of the vehicle's state.

Types and/or locations of objects or road features adjacent to the stopping location: Some classes of objects (such as delivery trucks) are more likely to move or have people appear around them than other classes of objects (such as potholes or road signs). The system may give lower preference to stopping locations that are adjacent to objects that are more likely to move. The system also may give lower preference to stopping locations with (i) objects that are positioned in locations that would interfere with the opening of a curbside door of the AV, or (ii) certain features of the road at the stopping location such as the presence of a driveway.

Alignment of the AV: The system may give preferences to stopping locations in which the AV can position itself so that a side of the AV is relatively more parallel to the curb. This may mean giving preference to stopping locations in which the curb is straight rather than curved.

The permissible stopping location criteria listed above are only examples. Any of these and/or other permissible stopping location criteria may be used.

When identifying the stopping location in step 504, the system may identify more than one candidate stopping location. If so, then it may use one of several possible methods to select the candidate stopping location into which the vehicle should move, and it will move the vehicle to that location at 506. For example, the system may select the candidate stopping location that meets the greatest number of the permissible stopping location criteria. Some of the permissible stopping location criteria may be designated as a gating criteria, such that a location will not even be considered to be a stopping location if it does not meet the gating criteria. Other criteria may be used to rank candidate stopping and select the stopping location with the highest rank.

Any or all of the permissible stopping location criteria may be weighted or be associated with a cost element, such that a cost function sums or otherwise factors the cost elements for each criterion that is satisfied and yields an overall cost for each candidate stopping location.

It is also notable that an AV's onboard systems will evaluate the environment in which the AV is traveling over multiple cycles, and continuously make adjustments. The AV's perception and motion planning systems may continuously monitor objects and environmental conditions to determine whether the selection of a PDZ should change. As other objects move in or out of the PDZ, at 505 the changed conditions may prevent or hinder the AV from reaching the stopping location. The AV will recalculate candidate stopping locations and move to a different stopping location at 506 if conditions warrant such a change.

Figure 6:
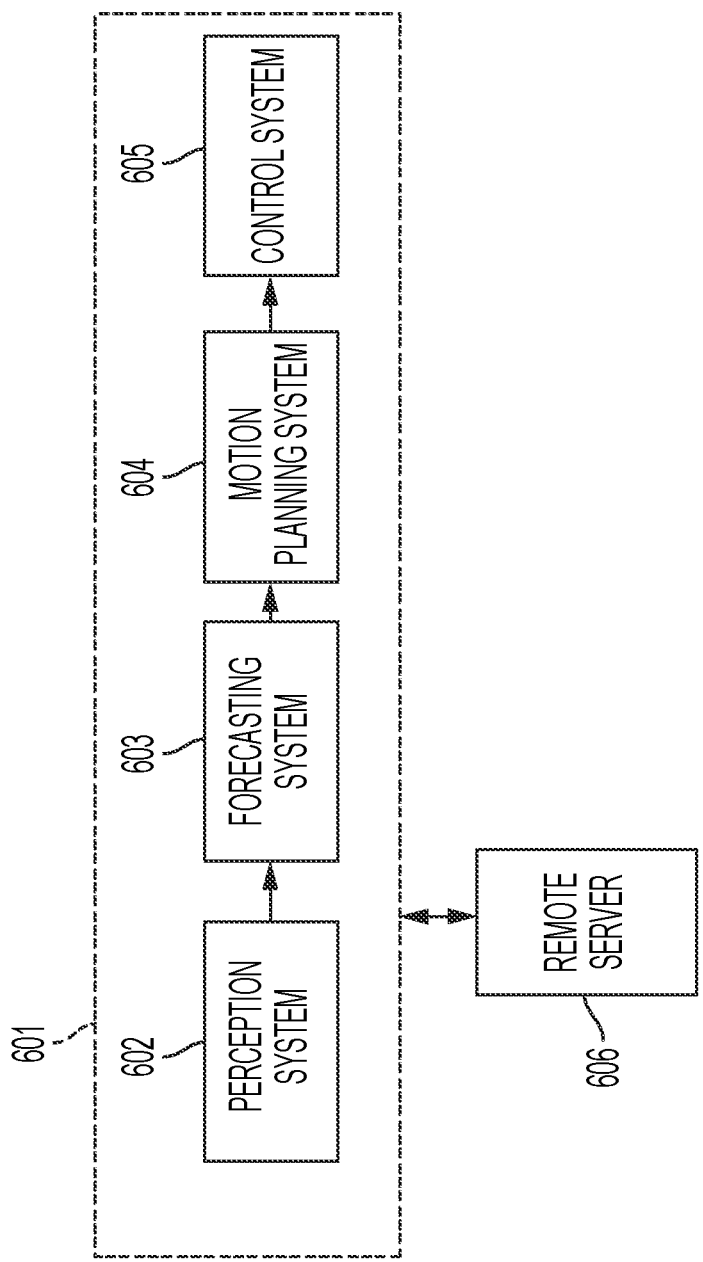
FIG. 6 is a block diagram that shows a high-level overview of certain AV subsystems.

FIG. 6 shows a high-level overview of vehicle subsystems that may be relevant to the discussion above. Specific components within such systems will be described in the discussion of FIG. 7 later in this document. Certain components of the subsystems may be embodied in processor hardware and computer-readable programming instructions that are part of the vehicle on-board computing system 601.

The subsystems may include a perception system 602 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

In some situations, sensors that collect perception data may include one or more environmental sensors such as a thermometer that is configured to detect temperature, a photoelectric device that is capable of measuring the intensity of ambient light around the vehicle, If the vehicle is an AV, the vehicle's perception system 602 may deliver perception data to the vehicle's forecasting system 603. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 604 and motion control system 605 so that the receiving systems may assess such data and initiate any number of reactive motions to such data. The motion planning system 604 and control system 605 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

In non-AV embodiments, such as with vehicles that are driven by human operators, the motion planning system 604 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 602 may include a transceiver of an electronic device that receives certain perception data (such as weather data) from a remote server via wireless communication.

The vehicle's on-board computing system 601 will be in communication with a remote server 606. The remote server 606 is an external electronic device that is in communication with the vehicle's on-board computing system 601, either via a wireless connection while the vehicle is making a run, or via a wired or wireless connection while the vehicle is parked at a docking facility or service facility. The remote server 606 may receive data that the vehicle collected during its run, such as perception data and operational data. The remote server 606 also may transfer data or other information to the vehicle such as software updates, high definition (HD) map updates, machine learning model updates and other information.

Figure 7:
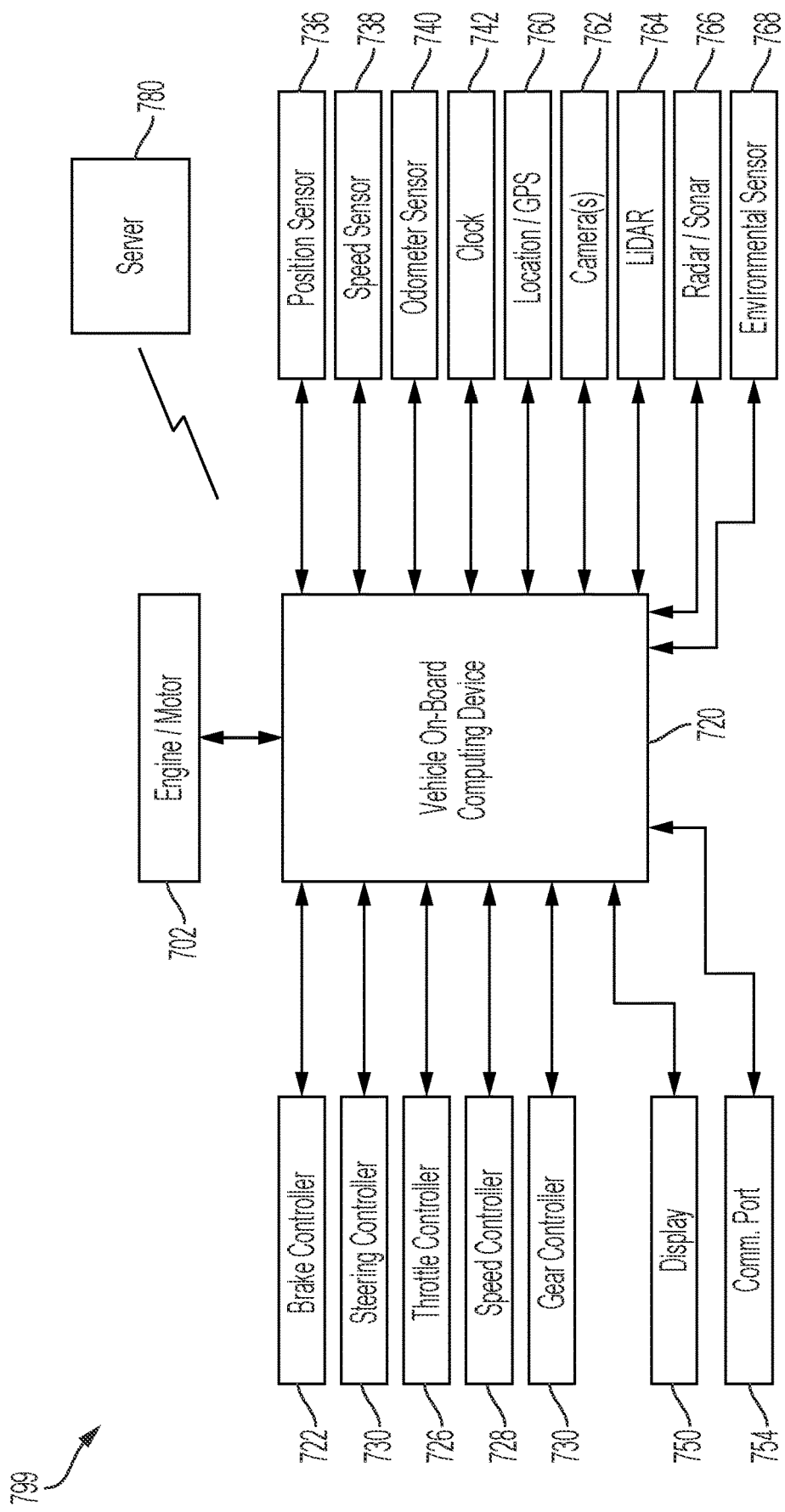
FIG. 7 illustrates example systems and components of an autonomous vehicle.

FIG. 7 illustrates an example system architecture 799 for a vehicle, such as an AV. The vehicle includes an engine or motor 702 and various sensors for measuring various parameters of the vehicle and/or its environment. Operational parameter sensors that are common to both types of vehicles include, for example: a position sensor 736 such as an accelerometer, gyroscope and/or inertial measurement unit; a speed sensor 738; and an odometer sensor 740. The vehicle also may have a clock 742 that the system uses to determine vehicle time during operation. The clock 742 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 760 such as a global positioning system (GPS) device; object detection sensors such as one or more cameras 762; a LiDAR sensor system 764; and/or a radar and or and/or a sonar system 766. The sensors also may include environmental sensors 768 such as: (a) a photosensor or other light sensor that can measure intensity of ambient light around the vehicle; (b) a rain sensor such as a sensor that projects infrared light into a windshield at an angle uses a measure of the amount of light that is reflected back to the sensor to measure an amount of precipitation that is on the windshield; and/or (c) an ambient temperature gauge or other type of temperature sensor. The object detection sensors may enable the vehicle to detect moving actors and stationary objects that are within a given distance range of the vehicle in any direction, while the environmental sensors collect data about environmental conditions within the vehicle's area of travel. The system will also include one or more cameras 762 for capturing images of the environment. Any or all of these sensors will capture sensor data that will enable one or more processors of the vehicle's on-board computing device 720 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device 754 (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle may encounter or affect in its environment.

During a run of the vehicle, information is communicated from the sensors to an on-board computing device 720. The on-board computing device 720 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 720 may control braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers.

Geographic location information may be communicated from the location sensor 760 to the on-board computing device 720, which may then access a map of the environment that corresponds to the location information to determine known fixed features of the environment such as streets, buildings, stop signs and/or stop/go signals. Captured images from the cameras 762 and/or object detection information captured from sensors such as a LiDAR system 764 is communicated from those sensors) to the on-board computing device 720. The object detection information and/or captured images may be processed by the on-board computing device 720 to detect objects in proximity to the vehicle 700. In addition or alternatively, the AV may transmit any of the data to an external server 780 for processing. Any known or to be known technique for performing object detection based on sensor data and/or captured images can be used in the embodiments disclosed in this document.

In addition, the AV may include an onboard display device 750 that may generate and output an interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and/or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network.

Figure 8:
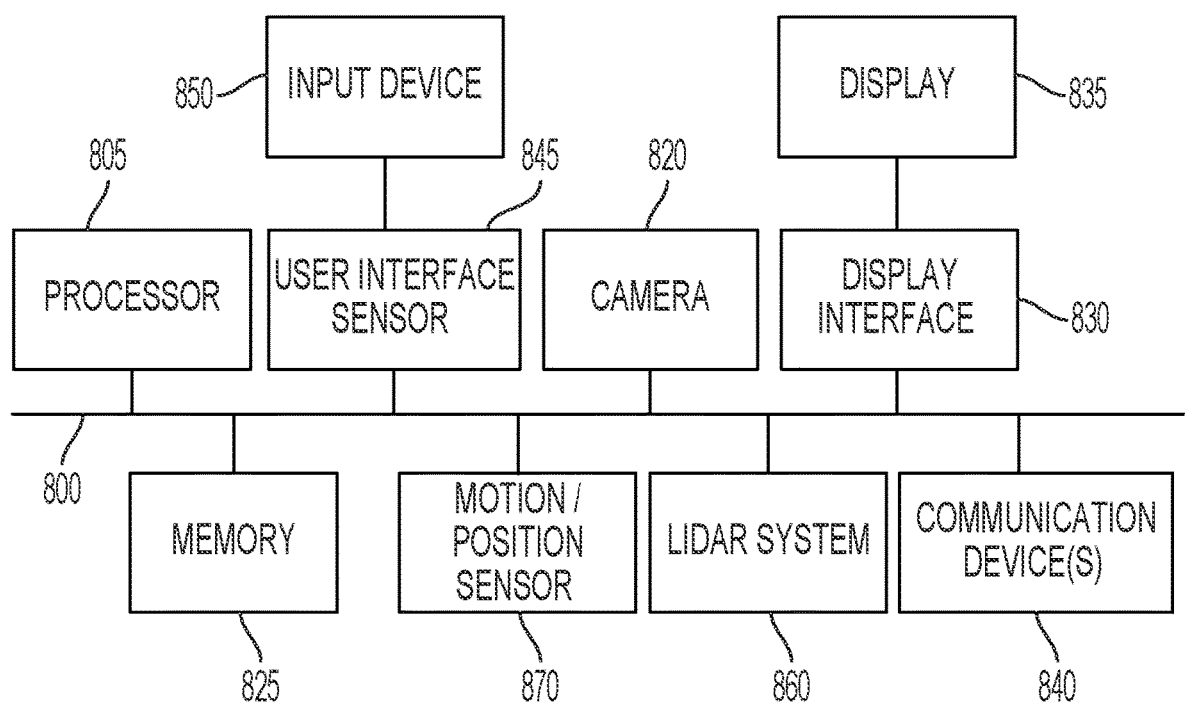
FIG. 8 is a block diagram that illustrates various elements of a possible electronic subsystem of an AV and/or external electronic device.

FIG. 8 depicts an example of internal hardware that may be included in any of the electronic components of the system, such as internal processing systems of the AV, external monitoring and reporting systems, or remote servers. An electrical bus 800 serves as an information highway interconnecting the other illustrated components of the hardware. Processor 805 is a central processing device of the system, configured to perform calculations and logic operations required to execute programming instructions that are stored on one or more memory devices 825. Various embodiments of the invention may include a computer-readable medium containing programming instructions that are configured to cause one or more processors to perform the functions described in the context of the previous figures.

An optional display interface 830 may permit information from the bus 800 to be displayed on a display device 835 in visual, graphic or alphanumeric format, such on an in-dashboard display system of the vehicle. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication system. The communication device(s) 840 may be configured to be communicatively connected to a communications network, such as the Internet, a local area network or a cellular telephone data network.

The hardware may also include a user interface sensor 845 that allows for receipt of data from input devices 850 such as a keyboard or keypad, a joystick, a touchscreen, a touch pad, a remote control, a pointing device and/or microphone. Digital image frames also may be received from a camera 820 that can capture video and/or still images. The system also may receive data from a motion and/or position sensor 870 such as an accelerometer, gyroscope or inertial measurement unit. The system also may receive data from a LiDAR system 860 such as that described earlier in this document.

The features and functions disclosed above, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions.

Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "ride" refers to the act of operating a vehicle to move from a point of origin to a destination in the real world, while carrying a passenger or cargo that embarks or is loaded onto the vehicle at the point of origin, and which disembarks or is unloaded from the vehicle at the destination.

In this document, the terms "street," "lane," "road" and "intersection" are illustrate d by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device", "server" or "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. A computer program product is a memory device with programming instructions stored on it. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

The invention claimed is:

1. A method for determining a pickup/drop-off zone (PDZ) for a vehicle, the method comprising:
by a processor:
receiving a ride service request that includes a requested destination for a vehicle,
defining a PDZ that is a geometric interval that is within a lane of a road at the requested destination by:
accessing a set of map data that includes the geometric interval,
using a length of the vehicle and a speed limit of the road at the requested destination to calculate a minimum allowable length for the PDZ by identifying a speed limit factor that is a function of the speed limit of the road and multiplying the length of the vehicle by the speed limit factor,
setting, as boundaries of the PDZ, a start point and an end point having an intervening distance that is equal to or greater than the minimum allowable length, and
positioning the PDZ in the lane at a location that includes or is within a threshold distance from the requested destination; and
generating a path to guide the vehicle to the PDZ, and
by a motion control system of the vehicle, moving the vehicle along the path to the PDZ.

2. The method of claim 1, further comprising, by an electronic device within the vehicle, outputting the path, the PDZ or both via a display, a speaker or both.

3. The method of claim 1, further comprising, by the processor:
receiving traffic data for the road at the requested destination, and
using the traffic data to calculate the minimum allowable length for the PDZ.

4. The method of claim 3, further comprising, by the processor,
using the traffic data to generate a traffic label for the road at the requested destination;
identifying a traffic factor that is a function the traffic label; and
when using the length of the vehicle to calculate the minimum allowable length, multiplying the length by the traffic factor.

5. The method of claim 1, further comprising, by the processor:
receiving environmental data for the road at the requested destination;
using the environmental data to generate an environmental factor; and
when calculating the minimum allowable length for the PDZ, using the environmental factor to calculate the minimum allowable length for the PDZ.

6. The method of claim 5, further comprising, by a perception system, generating the environmental data by one or more of the following:

using a temperature sensor of the vehicle to measure ambient temperature around the vehicle;
using a rain sensor of the vehicle to measure a precipitation level around the vehicle; or
using a light sensor of the vehicle to measure a luminance level of ambient light around the vehicle.

7. The method of claim 1, wherein positioning the PDZ in the lane at a location that includes or is within a threshold distance from the requested destination comprises requiring that the location satisfy one or more the following criteria:
a start boundary of the PDZ must be located at least a threshold distance after a first intersection along the path to the PDZ;
an end boundary of the PDZ must be located at least a threshold distance before a second intersection along the path after the PDZ;
the lane must be of a specified type of lane; or
the lane must not be of a restricted class of lane.

8. The method of claim 1, further comprising displaying the PDZ as an overlay on the lane in a map on an in-vehicle display for an operator to view.

9. The method of claim 1, further comprising:
by a perception system of the vehicle when the vehicle approaches or reaches the PDZ, identifying an object that is occluding at least a portion of the PDZ;
by a motion planning system of the vehicle, using data captured by the perception system to identify a stopping location that does not include the portion of the PDZ that is occluded; and
by a motion control system of the vehicle, causing the vehicle to move into the stopping location.

10. A system for determining a pickup/drop-off zone (PDZ) for a vehicle, the system comprising:
a processor, and a computer-readable medium containing programming instructions that are configured to cause the processor to, upon receiving a ride service request that includes a requested destination for a vehicle:
define a PDZ that is a geometric interval that is within a lane of a road at the requested destination by:
accessing a set of map data that includes the geometric interval,
using a length of the vehicle and a speed limit of the road at the requested destination to calculate a minimum allowable length for the PDZ by identifying a speed limit factor that is a function of the speed limit of the road and multiplying the length of the vehicle by the speed limit factor,
setting, as boundaries of the PDZ, a start point and an end point having an intervening distance that is equal to or greater than the minimum allowable length,
setting, as boundaries of the PDZ, a start point and an end point having an intervening distance that is equal to or greater than the minimum allowable length, and
positioning the PDZ in the lane at a location that includes or is within a threshold distance from the requested destination; and
generate a path to guide the vehicle to the PDZ; and
a motion control system configured to move the vehicle along the path to the PDZ.

11. The system of claim 10, further comprising additional programming instructions that are configured to cause an electronic device within the vehicle to output the path, the PDZ or both via a display, a speaker or both.

12. The system of claim 10, further comprising additional programming instructions to, when calculating the minimum allowable length for the PDZ, also using traffic data for the road at the requested destination to calculate the minimum allowable length for the PDZ.

13. The system of claim 10, further comprising additional programming instructions to:
use the environmental data for the road at the requested destination to generate an environmental factor; and
when calculating the minimum allowable length for the PDZ, use the environmental factor to calculate the minimum allowable length for the PDZ.

14. The system of claim 10, wherein the programming instructions to position the PDZ in the lane at a location that includes or is within a threshold distance from the requested destination comprise instructions to select a location that satisfies one or more the following criteria:
a start boundary of the PDZ must be located at least a threshold distance after a first intersection along the path to the PDZ;
an end boundary of the PDZ must be located at least a threshold distance before a second intersection along the path after the PDZ;
the lane must be of a specified type of lane; or
the lane must not be of a restricted class of lane.

15. The system of claim 10, further comprising additional programming instructions that are configured to cause the processor to, in response to a perception system of the vehicle identifying an object that is occluding at least a portion of the PDZ when the vehicle approaches or reaches the PDZ;
use data captured by the perception system to identify a stopping location that does not include the portion of the PDZ that is occluded; and
generate an alternate path to guide the vehicle to the stopping location.

16. A non-transitory computer program product for determining a pickup/drop-off zone (PDZ) for a vehicle, the product comprising programming instructions that are configured to cause a processor to, upon receiving a ride service request that includes a requested destination for a vehicle:
define a PDZ that is a geometric interval that is within a lane of a road at the requested destination by:
accessing a set of map data that includes the geometric interval,
using a length of the vehicle and a speed limit of the road at the requested destination to calculate a minimum allowable length for the PDZ by identifying a speed limit factor that is a function of the speed limit of the road and multiplying the length of the vehicle by the speed limit factor, and
setting, as boundaries of the PDZ, a start point and an end point having an intervening distance that is equal to or greater than the minimum allowable length, and
positioning the PDZ in the lane at a location that includes or is within a threshold distance from the requested destination; and
generate a path to guide the vehicle to the PDZ, wherein the path comprises instructions that are configured to direct a motion control system of the vehicle to move the vehicle along the path to the PDZ.

17. The computer program product of claim 16, further comprising additional programming instructions that are configured to cause an electronic device within the vehicle to output the path, the PDZ or both via a display, a speaker or both.

* * * * *